US008271755B1

(12) United States Patent
Helliker

(10) Patent No.: US 8,271,755 B1
(45) Date of Patent: *Sep. 18, 2012

(54) DISCOVERING DATA STORAGE FOR BACKUP

(75) Inventor: Fabrice Helliker, Broadstone (GB)

(73) Assignee: Quest Software, Inc., Aliso Viejo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/425,166

(22) Filed: Mar. 20, 2012

Related U.S. Application Data

(63) Continuation of application No. 13/179,813, filed on Jul. 11, 2011, now Pat. No. 8,145,864, which is a continuation of application No. 11/152,351, filed on Jun. 13, 2005, now Pat. No. 7,979,650.

(51) Int. Cl.
G06F 12/00 (2006.01)

(52) U.S. Cl. ......................... 711/162; 711/170; 707/604

(58) Field of Classification Search .................. 711/162, 711/170; 707/644
See application file for complete search history.

(56) References Cited

U.S. PATENT DOCUMENTS

| 5,819,020 | A | 10/1998 | Beeler, Jr. |
| 5,974,563 | A | 10/1999 | Beeler, Jr. |
| 6,041,364 | A | 3/2000 | Lortz et al. |
| 6,957,437 | B1 | 10/2005 | Bogia et al. |
| 7,979,650 | B2 | 7/2011 | Helliker |
| 8,145,864 | B1 * | 3/2012 | Helliker ..................... 711/162 |
| 2004/0186881 | A1 | 9/2004 | Porter et al. |
| 2005/0010835 | A1 | 1/2005 | Childs et al. |
| 2005/0102383 | A1 | 5/2005 | Sutler |
| 2005/0216481 | A1 | 9/2005 | Crowther et al. |

OTHER PUBLICATIONS

"How Plug and Play Works", Mar. 2003, Microsoft, pp. 1,4, 5 and 7.
"Network Data Management Protocol", Sep. 1997, NDMP, pp. 4,6, 12 and 25-27.
"Raidtec Launches SNZA R6 Network Attached Storage Filer", May 2001, Computer Technology Review.

* cited by examiner

Primary Examiner — Kalpit Parikh
(74) Attorney, Agent, or Firm — Knobbe Martens Olson & Bear, LLP

(57) ABSTRACT

A method for enhancing computer data backup includes storing identifications and corresponding functionalities for a plurality of storage devices in a database. A storage device that is in data communication with a computer that is to be backed up is selected. An identification of the storage device selected for use in the backup is determined. If functionalities for the selected storage device are contained in the database, then at least one of the functionalities for the selected storage device is used to enhance a data backup to the selected storage device. If functionalities for the selected storage device are not contained in the database, then the selected storage device can be queried in an attempt to match it to one of the storage devices contained in the database, so that functionalities for the storage device contained within the database can be used to enhance data backup.

20 Claims, 3 Drawing Sheets

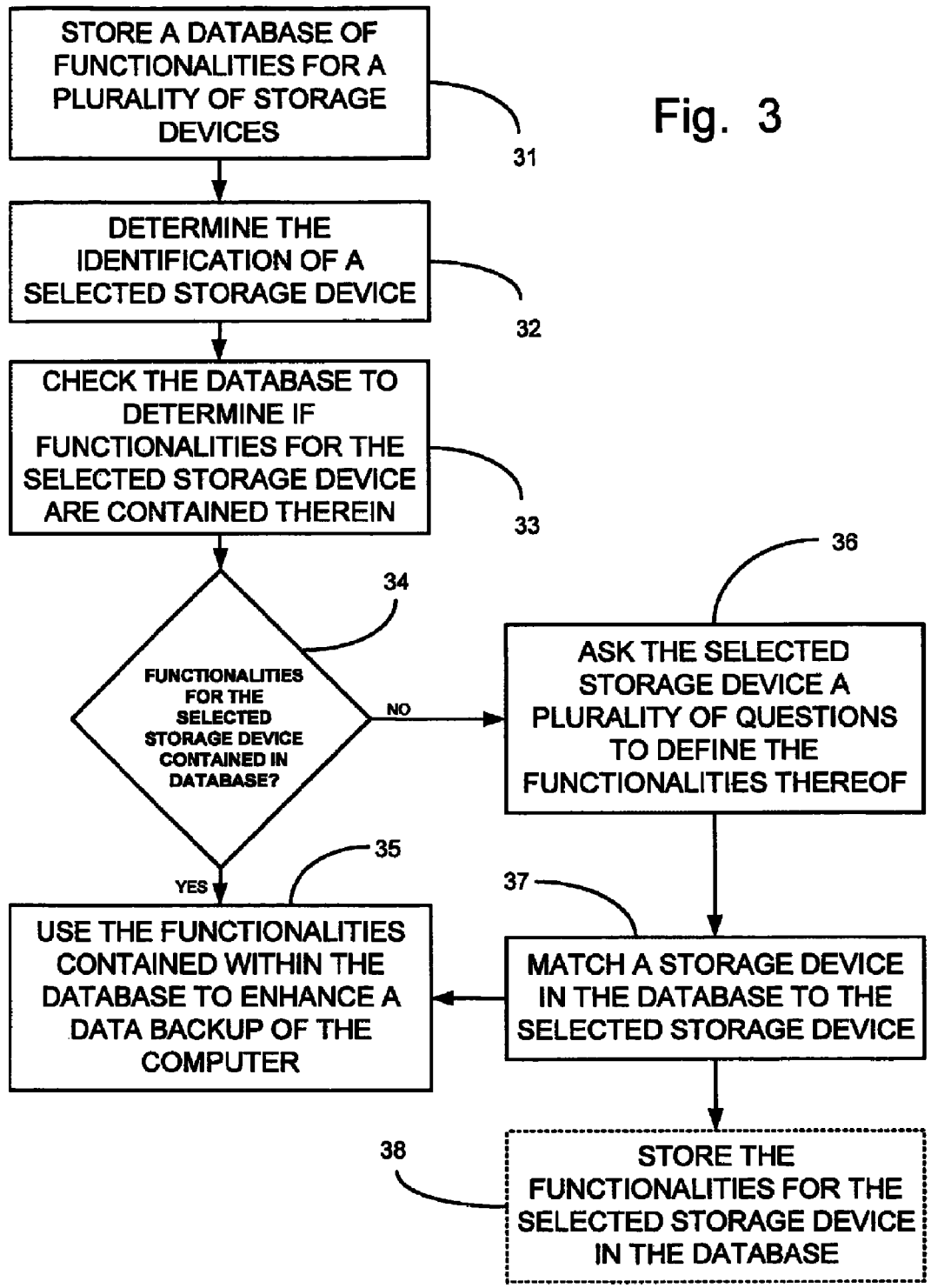

DISCOVERING DATA STORAGE FOR BACKUP

RELATED APPLICATION

This application is a continuation of U.S. application Ser. No. 13/179,813, filed on Jul. 11, 2011, titled "Discovering Data Storage for Backup", which is a continuation of U.S. application Ser. No. 11/152,351, filed on Jun. 13, 2005, titled "Discovering Data Storage for Backup", now U.S. Pat. No. 7,979,650, the entireties of which are hereby incorporated herein by reference.

TECHNICAL FIELD

The present invention relates generally to computers. The present invention relates more particularly to an apparatus and method for discovering data storage devices, particularly large data storage devices such as filers, for use in backup.

BACKGROUND

Backup procedures for computers are well known. Backup procedures are performed in order to provide a copy of the data stored on a computer or an associated storage device, so that the data can later be restored in the event that the original data is accidentally or maliciously lost.

As those skilled in the art will appreciate, data can be accidentally lost through computer hard disk failures, power losses, fires, floods, earthquakes, and a variety of other unfortunate events. Data can be maliciously lost through erasure, viruses, tampering, and other such intentional events. There is simply no way known at the present to prevent such accidental and malicious loss of data.

However, actual harm caused by the loss of data can be mitigated with comparatively little cost and inconvenience by implementing backup procedures to prepare for this eventuality. The use of backup procedures is general far less expensive and inconvenient than the consequences of irretrievably losing the data. One of the consequences of irretrievably losing data may be the need to reconstruct the data.

Reconstruction of the data is likely to be an undesirably costly and time consuming process. Indeed, many times the data simply cannot be reconstructed. The original sources of the data may no longer exist or may be untraceable. Important information is often permanently lost with severe financial consequences.

Backing up data is merely the process of making an extra copy of the data, so that if the original data is lost or corrupted, the extra copy may be used in its place. This redundancy decreases the likelihood that a single incident or malicious event can make the data permanently unavailable.

The backed up data is copied to another storage device. This backup storage device typically has removable media, so that the backed up data can then be easily moved to a remote location for safe keeping. Thus, even in the event of a catastrophe, such as a fire or earthquake, at the location of the original data, the backed up data is not likely to be affected.

Various different systems for performing backups are known. Backups can be made to network attached storage (NAS) devices, storage area networks (SANs) and a variety of other storage devices, including tape drives. A NAS device is a storage device that is dedicated solely to file sharing. NAS devices typically communicate using TCP/IP over an Ethernet connection. Although multiple storage devices can be used, NAS systems frequently use a single storage device. A NAS device can add storage capacity to a server without disruption of the system. That is, since a NAS device is not an integral part of a server, there is no need to shut down the system when adding a NAS device. A NAS device can be located anywhere that is desired within a LAN.

A SAN is a network of shared data storage devices that communicate using Fibre Channel over a SCSI interface. Thus, a SAN has several separate storage devices. A SAN provides simplified storage management, more efficient access to stored data, scalability, and easier backup.

Large sets of disk drives that are bundled together for use in file serving and/or backups are known as filers. Filers communicate with in a proprietary manner. Communication is a proprietary manner can cause some problems in the backup process, as discussed in further detail below.

An advantage of backing up to a NAS device, a SAN, or some other disk based storage system rather than backing up to a tape drive is the speed of the process. Since backups can be performed much more rapidly to disk based storage system, there is less disruption to the server, as well as to the network in general, than when a backup is being made to a tape drive. Thus, it is possible to perform a backup during the day when the server is busy.

Backups may also be performed tape. However, in order to expedite the backup process (and thus mitigate any undesirable impact to routine computer operations), backup are often performed to a disk based storage system such as a NAS or SANs system and then subsequently transferred to tape.

In any event, it is necessary to identify the storage system to which a backup is to be made in order to perform the backup. However, discovering a filer is rather difficult. A filer is not a smart device that gives you a detailed profile of its functional capabilities.

Connecting a large storage device to a system or network is only one step in the installation process. The more important step is to ensure that operating systems, applications and other devices can communicate efficiently with the large storage device. Because filers are so proprietary in the way that they operate and communicate, the applications and operating systems have to be specifically setup and supported in order to properly communicate with a filer. To help facilitate this communication a standard known as Network Data Management Protocol (NDMP) has been adopted. Thus, an NDMP filer is a filer that can communicate through an NDMP protocol, which is a predefined specified protocol that is specifically for the transfer of data. NDMP does not automatically communicate information regarding the functionalities of a storage device. Neither does NDMP automatically take advantage of such functionalities.

The NDMP initiative was launched to create an open standard protocol for network-based backup for network-attached storage. The protocol allows backup and network-attached file server vendors to focus investment on functionality instead of excessive porting, and gives users an unprecedented level of choice and interoperability. The objective of this protocol is to help address the problem of backing up networks of heterogeneous file servers, including dedicated file servers or filers, with any of several backup applications. Prior to the existence of the protocol, backup vendors would port to and track many different platforms and operating system releases, with filers presenting a special challenge because of the desire to have them be backup-ready (eliminating the need to specially install backup client software). Dedicated file server vendors tried to make sure that all the newest, most important backup applications were available for their current and new releases.

Although the NDMP protocol creates a protocol to facilitate communication with filers, there is still an issue of defining the functionality of a specific filer. As such, although the prior art has recognized, to a limited extent, the problem of recognizing and taking advantage of the capabilities or functionality of storage devices such as filers, the proposed solutions have, to date, been ineffective in providing a satisfactory remedy. Therefore, it is desirable to provide an apparatus and method for discovering data storage devices, particularly large data storage devices such as filers, for use in backup.

BRIEF SUMMARY

A method for enhancing computer data backup is disclosed. According to one aspect of the present invention, the method comprises storing identifications and corresponding functionalities for a plurality of storage devices in a database. A storage device for use in a backup is selected. If an identification for the selected storage device is contained in the database, then at least one of the corresponding functionalities for the selected storage device is used to enhance a data backup to the selected storage device.

According to one aspect of the present invention, if an identification for the selected storage device is not contained in the database, then the selected storage device can be queried in an attempt to match it to one of the storage devices contained in the database, so that functionalities for the matched storage device (which are listed within the database) can be used to enhance data backup.

Thus, according to one or more aspects of the present invention, computer data backups are enhanced by taking advantage of functionalities of the selected storage device without having to use backup software that is dedicated to use with that particular storage device.

This invention will be more fully understood in conjunction with the following detailed description taken together with the following drawings.

BRIEF DESCRIPTION OF THE DRAWINGS

FIG. 3 is a flow chart showing a method for enhancing computer data backups, according to an exemplary embodiment of the present invention.

Embodiments of the present invention and their advantages are best understood by referring to the detailed description that follows. It should be appreciated that like reference numerals are used to identify like elements illustrated in one or more of the figures.

DETAILED DESCRIPTION OF THE PREFERRED EMBODIMENT

The present invention facilitates the use of functionalities of a storage device, e.g., filer, without requiring the use of software that is dedicated to the storage device. This is accomplished by creating templates or fingerprints of a plurality of such known storage devices. Each fingerprint comprises an identification of a storage device and the functionalities associated with that storage device. The fingerprints include specific technical information that allows applications, more specifically backup applications, to utilize the storage device's functionality.

In operation if a storage device is encountered that is not included in the fingerprint or functionality database, then the storage device is queried so as to determine the functionalities thereof. The query can be accomplished using NDMP protocol. Information learned via the query process can be used to match the storage device to a fingerprint of another device within the database that has similar functionality and the fingerprint of that storage device can then be used to take advantage of functionalities of the storage device to which a backup is to be made.

Figure 1:
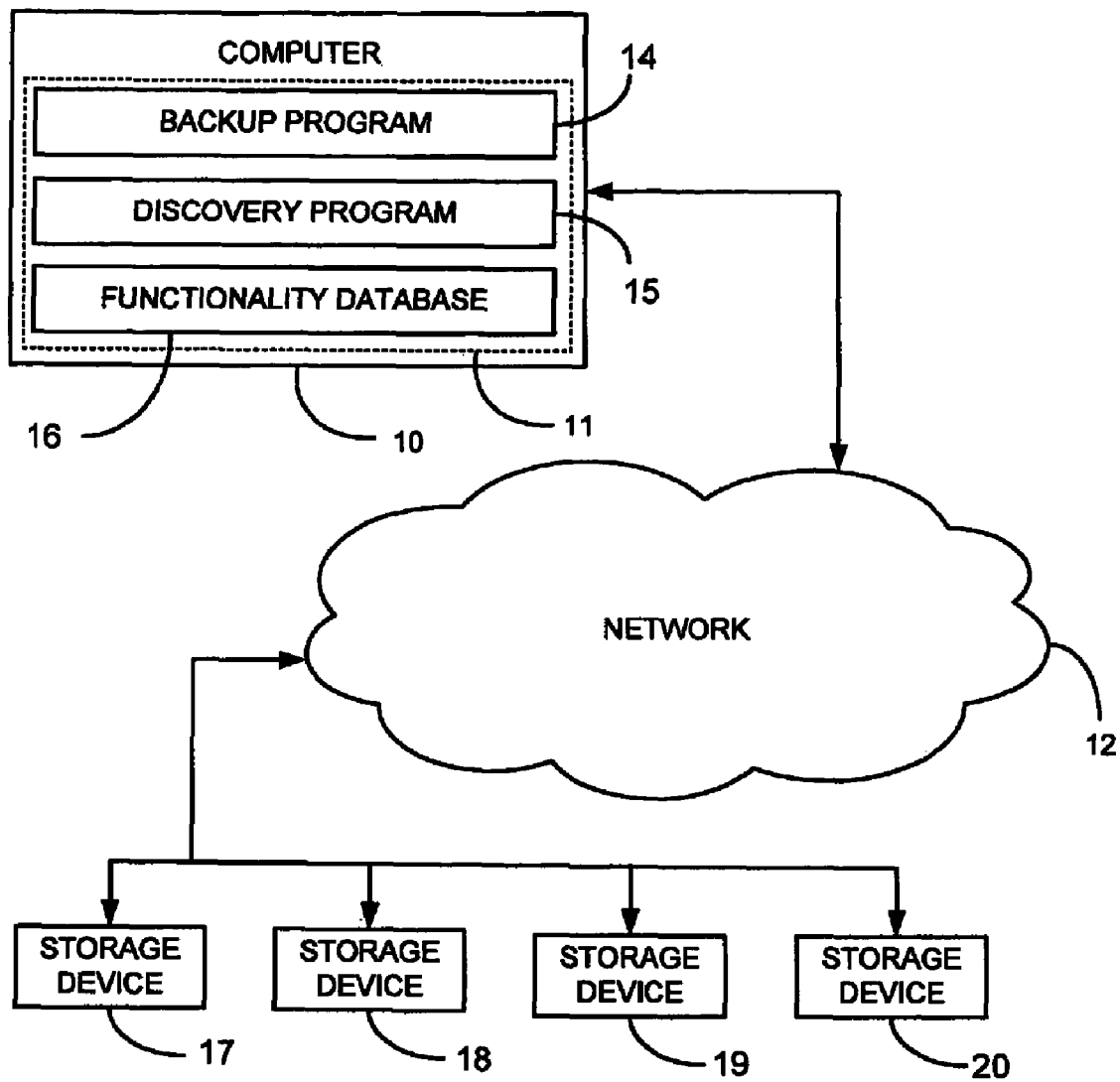
FIG. 1 is a block diagram showing a computer and a plurality of storage devices in data communication with the computer, wherein the computer is configured to take advantage of functionalities of a selected storage device during a data backup, according to an exemplary embodiment of the present invention.

Referring now to FIG. 1, one embodiment of the present invention comprises a general purpose computer 10 that is in communication with a plurality of storage devices 17-20, such as via a network 12. Although network 12 will typically be a local area network (LAN), the network may alternatively be a wide area network (WAN), such as the Internet. Computer 10 can be the computer being backup up. Alternatively, computer 10 can facilitate backing up of another computer.

General purpose computer 10 comprises a memory 11 within which are stored a backup program 14, a storage device discovery program 15, and a functionality database 16. Memory 11 can be read only memory (RAM), such as the working memory of computer 10. Memory 11 can also be a hard disk drive or any other desired type of memory. Further, memory 11 can be a combination of different types of memory. For example, backup program 14 and discovery program 15 can be stored in RAM, while functionality database 16 is stored on a hard disk drive. Memory 11 does not have to be part of computer 10 or even be directly attached thereto. Rather memory 11 can be accessed via network 12 or by any other desired means. Indeed, memory 11 can be distributed across a plurality of different computers and/or storage devices.

Backup program 14 and discovery program 15 do not have to be executed by the same computer. Further, functionality database does not have to be stored on the same computer as either backup program 14 or discovery program 15.

Storage devices 17-20 can be a plurality of different types of storage devices. For example, some of storage devices 17-20 can be network attached storage (NAS) devices, storage area networks (SANs) and/or tape drives. Typically, storage devices 17-20 will be large capacity storage devices. That is, typically, storage devices 17-20 will have much greater capacity than the onboard storage (such as a hard disk drive) of computer 10. Storage devices 17-20 can be filers. Storage devices 17-20 can have capacities greater than one terabyte.

Figure 2:
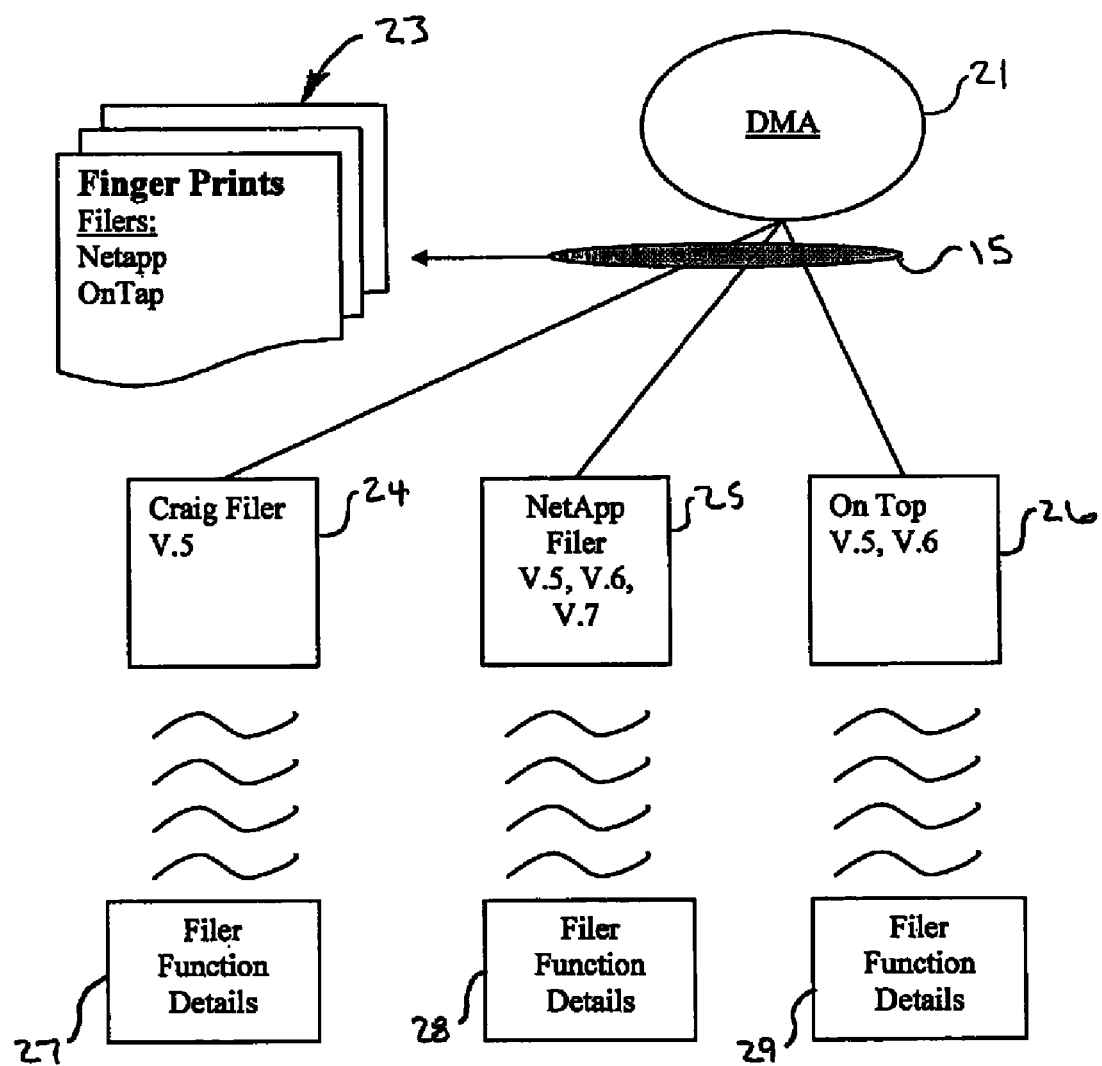
FIG. 2 is a conceptual block diagram showing a plurality of fingerprints (database entries of storage device identifications and corresponding functionalities) and also showing a plurality of physical storage devices, according to an exemplary embodiment of the present invention.

Referring now to FIG. 2, according to one embodiment of the present invention computer 10 can use direct memory access (DMA) to access fingerprints 23 and to communicate with storage devices 17-20, three specific examples of which are referred to as Craig filer 24, NetApp 25 and On Top 26. Accessing fingerprints 23 and communicating with storage devices 17-20 can be accomplished using discovery program 15.

Associated with each storage device are functional details. For example, associated with Craig filer 24 storage device are filer function details 27, associated with NetApp filer 25 storage device are filer function details 28 and associated with On Top 26 storage device are filer function details 29.

Filer function details 27-29 provide information regarding functionalities of a storage device beyond that which is provided by NDMP. NDMP is merely a protocol that facilitates communication between compliant devices and provides very little or no information regarding the actually functionality of a storage device. However, NDMP can be used to facilitate communication between computer 10 and storage devices 17-20.

Examples of such functionalities include the support of a particular version of NDMP, the provision of SCSI information for tape (support of GET_TAPE_INFO?), support of raw open, support of DAR support (can a DAR bring back just a directory with no files?), backup type supported (dump, tar, image, etc.), tape drive/library device node names, support of 3 way, support of heterogeneous 3 way supported, support for UPDATE argument, support for rename/relocate from anywhere with files and directories, mover window support, support for incremental backups, and support for incremental restore (will incremental restores deleted removed files?).

By knowing which functionalities a storage device is capable of providing, at least some of these functionalities can be taken advantage of so as to enhance a backup process. That is, the backup process can be performed more quickly, in a manner that more readily facilitates restoration of the backed up data, or in any other desirable fashion.

Referring now to FIG. 3, according to one embodiment the present invention comprises storing a database of functionalities for a plurality of different types of storage devices in a computer memory 11 (FIG. 1), as indicated in block 31. The identity of a selected storage device is determined by discovery program 15, as indicated in block 32. The identity of the storage device can be determined by reading the name, manufacturer, model number, and/or other identifying information from the storage device by computer 10. This information can also be manually entered by a system administrator or otherwise obtained.

The particular storage device 17, 18, 19, or 20 can be selected either automatically or manually. Automatic selection can be performed, for example, by backup program 14. Manual selection can be performed by a system administrator. In either event, one of the plurality of backup devices 17-20 that are available for use is selected as the backup device to which it is desired to perform a backup.

After the identity of the backup device has been determined, functionality database 16 is checked by discovery program 15 to determine if functionalities for the selected device are contained therein, as indicated in block 33. That is, functionality database 16 is checked to see if the selected storage device is listed therein. If the functionalities are contained within functionality database 16, then block 35 is next performed. Otherwise, block 36 is next performed.

Thus, if the functionalities are contained within functionality database 16 (there is a database entry for the selected storage device 17, 18, 19, or 20), then at least one of the functionalities contained within functionality database 16 for the selected storage device 17,18,19, or 20 is used to enhance a data backup of computer 10.

If the functionalities are not contained within functionality database 16 (there is no database entry for the selected storage device 17, 18, 19, or 20), then discovery program 15 asks the selected storage device 17,18,19, or 20 a plurality of questions in an attempt to define at least some the functionalities thereof, as indicated in block 36. It is worthwhile to note that although this query process may not determine all of the functionalities of storage device 17, 18, 19, or 20, it may still determine enough of the functionalities to facilitate enhancement of a computer data backup.

Some exemplary questions that may be asked according to block 36 include: What NDMP Version is supported?, Is SCSI info for tape supported?, Is GET_TAPE_INFO supported?, Is raw open supported?, Is DAR supported?, Can a DAR bring back just a directory with no files?, Is backup type (dump/tar/image/etc.) supported?, What are the tape drive/library device node names?, Is 3 way supported? Is heterogeneous 3 way supported? Is UPDATE argument supported?, Is rename/relocate from anywhere with files and directories supported?, Is mover window support?, Are incremental backups supported?, Is incremental restore supported, i.e., on incremental restores are removed files deleted?

The answers to these questions enable discovery program 15 to choose the best fingerprint for the new device out of the database of known fingerprints. The best fingerprint can be that fingerprint that most closely matches the functionalities of the selected storage device 17, 18, 19 or 20. A threshold can optionally be defined such that a minimum number of functionalities much match or such that certain functionalities must match before a match is declared.

The use of such matches may limit some proprietary functionality of the storage device 17, 18, 19, or 20. However, the at least one embodiment of the present invention enables the user to quickly begin using the filer for storage and backup. Such use is likely to be with enhance functionality as compared to use of storage device 17, 18, 19, or 20 without the functionality match described above.

At a latter time a fingerprint can be generated for the new storage device 17-20. This fingerprint can be uploaded to the fingerprint or functionality database 16 and can then be used by discovery program 15 for driving the selected storage device 17, 18, 19, or 20. At that time the complete functionality for the proprietary storage device 17, 18, 19, or 20 can be included Thus, attempt is made to match a storage device entry in functionality database 16 to selected storage device 17-20, as indicated in block 37. It is not necessary for all of the functionalities of a storage device entry in functionality database 16 to be exactly the same as those of selected device 17-20 in order to make a match. Rather, it is only necessary for enough of the functionalities to be the same or close enough so as to permit use of the functionalities for the matched storage device of functionality database 16 to be able to provide an enhance backup. Thus, if the best match will enhance the backup process, then this match can be used, as indicated in block 35.

If none of the functionality database entries are suitable, then no match is made. In this instance, some of the functionalities that were learned as a result of the query process may be used to enhance a backup.

Optionally, the functionalities learned as a result of the query process can be stored along with the identity of the selected storage device 17-20, so as to define an additional entry in functionality database 16. This entry can be updated, as described above, when more information regarding the functionalities of selected storage device 17, 18, 19, or 20 are learned.

Optionally, an image of a discovered storage device can be displayed, so as to help a system administrator understand what discovery program 15 is doing. That is, when a discovery process begins, such as when a selected storage device 17, 18, 19, or 20 is determined not to have an entry in functionality database 16, then an image of that storage device can be display so as to alert the system administrator that a discovery process for that storage device is taking place.

Thus, an apparatus and method are provided for discovering data storage devices, particularly large data storage devices such as filers, for use in backup. The apparatus and method of at least one embodiment of the present invention mitigate the need for software that is dedicated to a particular storage device, as is commonly needed for use with filers and the like.

Embodiments described above illustrate, but do not limit, the invention. It should also be understood that numerous modifications and variations are possible in accordance with the principles of the present invention. Accordingly, the scope of the invention is defined only by the following claims.

What is claimed is:

1. A method for enhancing computer data backups, the method comprising:
storing in a database identifications and functionalities associated with each backup storage device of a plurality of backup storage devices;
asking a selected backup storage device a plurality of questions to define functionalities associated with the selected backup storage device, the selected backup storage device not being one of the plurality of backup storage devices, the functionalities associated with the selected backup storage device including DAR support;
matching a threshold of the functionalities associated with the selected backup storage device with the stored functionalities associated with at least one backup storage device of the plurality of backup storage devices, the threshold including the DAR support;
identifying the at least one backup storage device of the plurality of backup storage devices matching the threshold; and
enhancing a data backup of a backup source computer to the selected backup storage device by using at least one of the stored functionalities associated with the identified backup storage device.

2. The method of claim 1 wherein the threshold is a minimum number of functionalities that match.

3. The method of claim 1 wherein the threshold is a certain number of functionalities that match.

4. The method of claim 1 wherein the threshold is the DAR support.

5. The method of claim 1 wherein whether the selected backup storage device supports DAR includes whether the selected backup storage device supports DAR bringing back a directory with no files.

6. The method of claim 1 wherein the selected backup storage device is automatically selected by a backup program.

7. The method of claim 1 wherein the functionalities used to enhance the data backup include at least one functionality selected from the group consisting of NDMP version support, SCSI info for tape, raw open support, the DAR support, can DAR return only directory, type of backup supported, tape drive/library device node names, 3 way support, heterogeneous 3 way support, UPDATE argument supported, support for rename/relocate from anywhere with files and directories, mover window support, incremental backup support, and incremental restore support.

8. The method of claim 1 further comprising enhancing the data backup of the backup source computer to the selected backup storage device using the DAR support when the threshold is not met.

9. A system for enhancing computer data backups, the system comprising:
computer hardware including at least one computer processor; and
non-transitory computer-readable storage including computer-readable instructions that, when executed by the computer processor, cause the computer hardware to perform operations defined by the computer-readable instructions, the computer-readable instructions configured to:
store in a database identifications and functionalities associated with each backup storage device of a plurality of backup storage devices;
ask a selected backup storage device a plurality of questions to define functionalities associated with the selected backup storage device, the selected backup storage device not being one of the plurality of backup storage devices, the functionalities associated with the selected backup storage device including DAR support;
match a threshold of the functionalities associated with the selected backup storage device with the stored functionalities associated with at least one backup storage device of the plurality of backup storage devices, the threshold including DAR support;
identify the at least one backup storage device of the plurality of backup storage devices matching the threshold; and
enhance a data backup of a backup source computer to the selected backup storage device by using at least one of the stored functionalities associated with the identified backup storage device.

10. The system of claim 9 wherein the threshold is a minimum number of functionalities that match.

11. The system of claim 9 wherein the threshold is a certain number of functionalities that match.

12. The system of claim 9 wherein the threshold is the DAR support.

13. The method of claim 9 wherein whether the selected backup storage device supports DAR includes whether the selected backup storage device supports DAR returning only a directory.

14. The system of claim 9 wherein the functionalities used to enhance the data backup include at least one functionality selected from the group consisting of NDMP version support, SCSI info for tape, raw open support, the DAR support, can DAR return only directory, type of backup supported, tape drive/library device node names, 3 way support, heterogeneous 3 way support, UPDATE argument supported, support for rename/relocate from anywhere with files and directories, mover window support, incremental backup support, and incremental restore support.

15. The system of claim 9 wherein the computer-executable instructions are further configured to enhance the data backup of the backup source computer to the selected backup storage device using the DAR support when the threshold is not met.

16. A system for enhancing computer data backups, the system comprising:
computer hardware including at least one computer processor; and
non-transitory computer-readable storage including computer-readable instructions that, when executed by the computer processor, cause the computer hardware to perform operations defined by the computer-readable instructions, the computer-readable instructions configured to:
store in a database identifications and functionalities associated with each backup storage device of a plurality of backup storage devices;
means for asking a selected backup storage device a plurality of questions to define functionalities associated with the selected backup storage device, the selected backup storage device not being one of the plurality of backup storage devices, the functionalities associated with the selected backup storage device including DAR support;

means for matching a threshold of the functionalities associated with the selected backup storage device with the stored functionalities associated with at least one backup storage device of the plurality of backup storage devices, the threshold including DAR support;

means for identifying the at least one backup storage device of the plurality of backup storage devices matching the threshold; and enhancing a data backup of a backup source computer to the selected backup storage device by using at least one of the stored functionalities associated with the identified backup storage device.

17. The system of claim 16 further comprising means for enhancing the data backup of the backup source computer to the selected backup storage device using the DAR support when the threshold is not met.

18. The system of claim 16 wherein the threshold is a minimum number of functionalities that match.

19. The system of claim 16 wherein the threshold is a certain number of functionalities that match.

20. The system of claim 16 wherein the threshold is the DAR support.

\* \* \* \* \*